United States Patent [19]
Julian

[11] Patent Number: 5,346,782
[45] Date of Patent: Sep. 13, 1994

[54] CAP FOR COVERING TERMINAL BOLTS OF BATTERIES

[75] Inventor: Kenneth A. Julian, Oak Brook, Ill.

[73] Assignee: Julian Electric, Inc., Westmont, Ill.

[21] Appl. No.: 863,398

[22] Filed: Apr. 3, 1992

Related U.S. Application Data

[63] Continuation of Ser. No. 665,160, Mar. 6, 1991, abandoned.

[51] Int. Cl.⁵ .............................................. H01M 2/00
[52] U.S. Cl. ................................ 429/65; 174/138 F; 439/521
[58] Field of Search .............. 429/65, 181; 174/138 F; 439/522, 521

[56] References Cited

U.S. PATENT DOCUMENTS

| | | | |
|---|---|---|---|
| 3,884,725 | 5/1975 | Schmidt | 429/65 |
| 3,956,576 | 5/1976 | Jensen et al. | 429/65 X |
| 4,483,910 | 11/1984 | Julian | 429/179 |
| 4,920,018 | 4/1990 | Turner | 429/65 |
| 5,015,543 | 5/1991 | English | 429/65 |

*Primary Examiner*—Anthony Skapars
*Attorney, Agent, or Firm*—Patnaude, Videbeck & Marsh

[57] ABSTRACT

A cap is provided to cover the terminal heads of batteries and protect them from the elements. The cap is made of rubber or other pliable, non-conductive material and has a hollow cylindrical section and a planar section across the top of the cylindrical section. The cyclindrical section fits tightly over the terminal head, and the cap is retained over the terminal by the friction of the cylindrical section around the terminal head. The bottom of the cap seals against the insulated portions of a connector which is retained by the battery terminal.

1 Claim, 2 Drawing Sheets

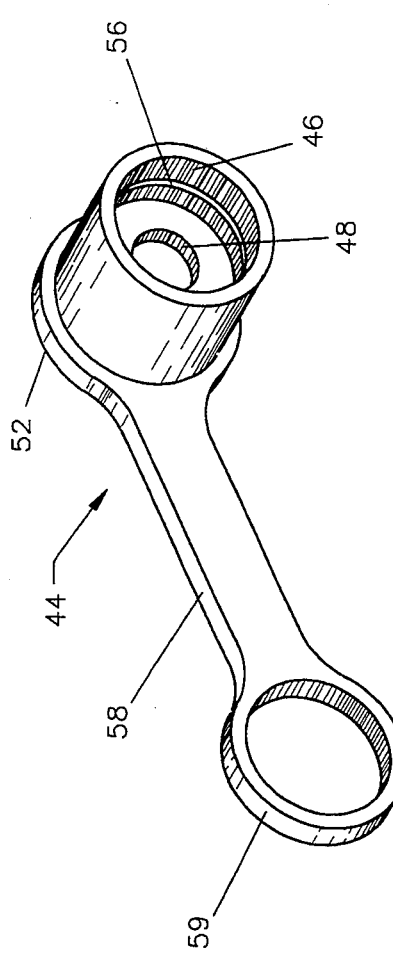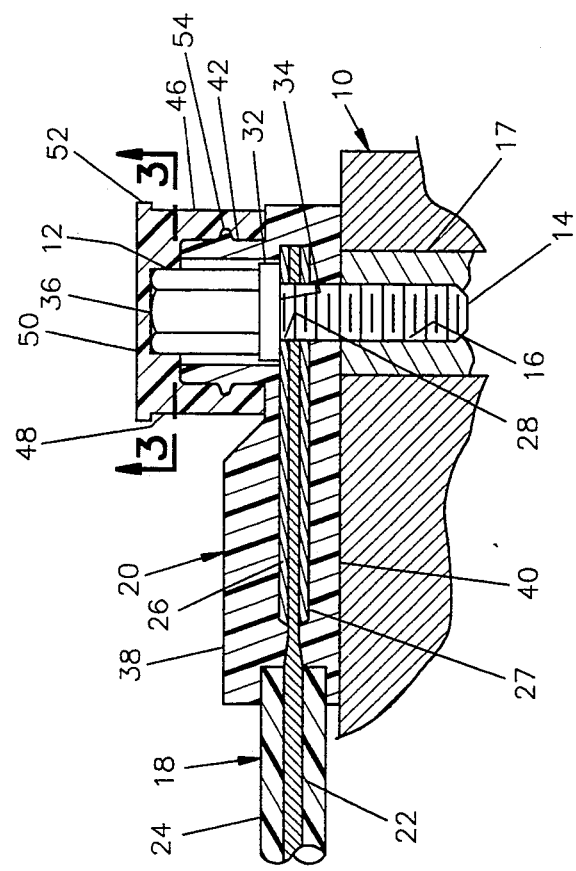

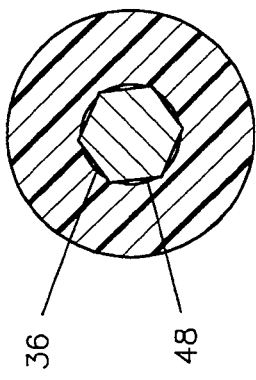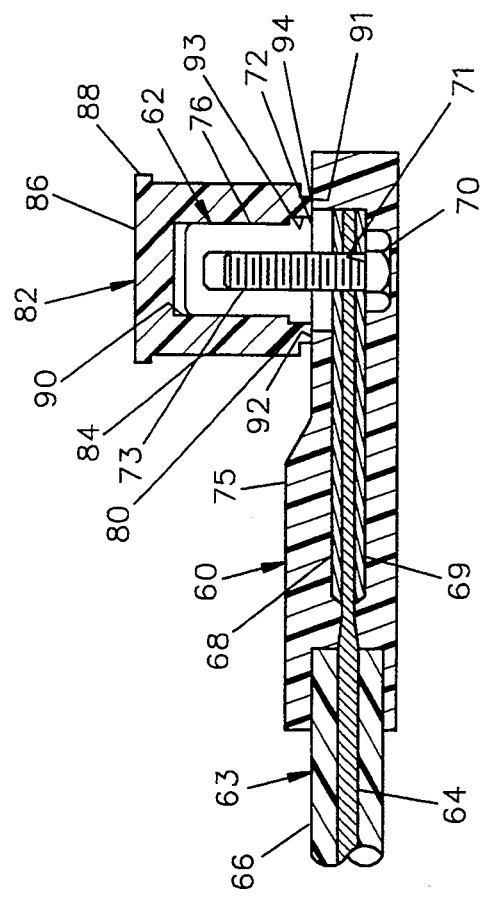

CAP FOR COVERING TERMINAL BOLTS OF BATTERIES

This is a continuation of copending application(s) Ser. No. 07/665,160 filed on Mar. 6, 1991 now abandoned.

The present invention relates in general to battery cable terminations, and it relates in particular to insulating caps used to cover a metal terminal of a battery to which a cable and its associated termination has been attached.

BACKGROUND OF THE INVENTION

The terminals of batteries such as used in motor vehicles are subject to corrosion and deterioration when exposed to the weather. The corrosion and deterioration shortens the usable life of the cable terminations and reduces the conductivity of the connection between the battery and the cable. Furthermore, the batteries of vehicles store substantial amounts of electrical energy and arcing and discharge of the battery can occur if a foreign object contacts the terminal.

To reduce the exposure of the terminal and the cable termination to the ambient and to protect against contact with foreign objects, the battery cables and the metal plate which fits over the battery terminal may be potted in an insulating elastomeric material. In this case, only a portion of the connector plate which surrounds an aperture through the termination and the terminal are left exposed, and these parts are covered by an insulating cap fitted over the terminal.

In order to hold the cap in assembled relationship over the terminal it was previously the practice to provide a tight fit between the cylindrical inner surface of the cap and the outer surface of a tubular projection of the elastomeric material part of the termination. One or more ridges on one of these surfaces and corresponding grooves on the other of these surfaces which fit into one another have been used to retain the cap in place.

The terminal extends outside the distal end of the tubular section of the connector in order that it may be reached with a conventional wrench for removing the cable. As a result, only a portion of the hollow cylindrical section of the cap is engaged by the tubular section of the cable termination. When batteries are installed in trucks and the like, they are subjected to mechanical shocks and vibrations which, over a long period of time, may cause the caps to disconnect and allow the battery terminal to be exposed.

It is, therefore, desireable to provide a cap which is secured to the cable termination and to the terminal itself along the entire depth of the cylindrical section of the cap, so as to maximize the surface area by which the cap is retained over the terminal.

SUMMARY OF THE INVENTION

Briefly, there is provided in accordance with the present invention a novel cap for covering the terminal of a battery to which a cable termination has has been attached, where the cable termination is potted in an insulating elastomeric material which sealably fits against the battery case and has an upwardly extending tubular projection surrounding the battery terminal. The cap is formed of an elastomeric insulating material and has upper and lower tubular sections, the upper tubular section of which is adapted to fit tightly around the terminal itself, and the lower tubular section of which extends downwardly and is adapted to fit tightly around a portion of the upwardly projecting tubular portion of the termination. The upper end of the cap is closed by an integral planar top lying transverse to the longitudinal axis of the two tubular sections.

GENERAL DESCRIPTION OF THE DRAWING

The present invention will be better understood by a reading of the following detailed description taken in connection with the accompanying drawings wherein:

FIG. 1 is an isometric view of a battery terminal cap embodying the invention;

FIG. 2 is a longitudinal cross-sectional view of a portion of a battery, an associated cable and termination and the cap shown in FIG. 1;

FIG. 3 is a cross-sectional view taken along the line 3—3 of FIG. 2; and

FIG. 4 is a longitudinal cross-sectional view of an alternative embodiment of the invention.

DETAILED DESCRIPTION OF THE INVENTION

A first embodiment of the invention is shown in FIGS. 1, 2 and 3 in which a battery 10 has an exterior terminal in the form of a bolt 12. The bolt 12 has a threaded shank 14 that screws into a threaded hole 16 in a metal terminal 17 which is connected to the positive or negative plates of the battery 10. A battery cable has a termination 20 connected to the distal end thereof. The cable 18 comprises a plurality of stranded metal wires 22 enclosed in an insulating cover 24 formed of a suitable plastic. At the end of the cable 18 connected to the termination 20, the wires 22 extend beyond the end of the cover 24 and are soldered between upper and lower rectangularly shaped metal connector plates 26 and 27 respectively. A hole 28 provided in the connector plates 26 and 27 is sufficiently large to permit the threaded shank 14 of the terminal bolt 12 to pass through and to screw into threaded hole 16 on the battery 10. The terminal bolt 12 has at a location midway along it's length an annular ridge 32 having a substantially flat annular under surface 34 which tightly engages the upper surface of the upper connector plate 26 when the terminal bolt 12 is passed through the hole 28 in the connector plates 26 and 27, and securely tightened into the threaded hole 16. The head 36 of the terminal bolt 12 is hexigonal in shape such that the terminal bolt 12 may be tightened into threaded hole 16 with a conventional wrench.

The connector plates 26 and 27 are potted in an elastomeric insulating enclosure 38 which hermetically seals the connector plates 26 and 27 and portions of the end of the cable 18. The enclosure 38 has a planar bottom surface 40. When the threaded shank 14 of terminal bolt 12 is passed through hole 28 and the terminal bolt 12 tightened, the planar bottom surface 40 of the elastomeric insulating enclosure 38 seals against the battery 10. The elastomeric insulating enclosure 38 entirely covers the end of the cable 18 and the connector plates 26 and 27 except for an annular portion of the upper plate 26 around the hole 28 in the connector plates 26 and 27.

The top of the enclosure 38 is shaped into a upwardly directed projection 42 extending concentric around the terminal bolt 12 with an inner diameter sufficiently large so as to not interfere with the wider parts of the terminal bolt 12 when the threaded shank 14 is passed through hole 28 and tightened into threaded hole 16. The tubular projection 42 does not extend upward around the entire height of the terminal bolt 12. A portion of the terminal bolt 12 extends above cylindrical projection 42 in order that one might grasp the terminal bolt 12 with a conventional wrench for fastening and releasing the cable 18 to the battery 10.

To protect the terminal bolt 12 from exposure to the elements, and from contact with foreign objects, a cap 44 in accordance with the present invention is provided. The cap 44 is formed of an insulating elastic material and has a lower tubular section 46, the inner surface of which fits tightly around the external surface of the tubular projection 42 and is thereby frictionally secured to it. The preferred depth of the lower tubular section 46 is approximately equal to the height of the exterior of the tubular upward projection 42 above the enclosure 38 surrounding the connector plates 26 and 27. Above the lower tubular section 46 is an integral upper tubular section 48 which is coaxial with the lower tubular section 46 and has an interior cross-sectional dimension which is a little smaller than the greatest distance between any two edges on the hexigon head of terminal bolt 12, as can best be seen in FIG. 3. Transverse to the axis of the tubular sections 46 and 48 is an integral planar top 50 which has a ridge 52 around its circumference to enable one to easily grasp the cap 44.

Although the preferred embodiment of the invention utilizes an annular ridge 54 around the outer surface of the tubular upward projection 42 and the annular groove 56 is provided in the inner surface of lower tubular section 44, the surfaces on which the groove and the ridge are placed could be reversed without detracting from the invention.

The top 50 of the cap 44 is attached by a flexible integral strap 58 to an integral loop 59 which can be fitted around the cable 18 near the battery termination 20 such that the cap 44 will not be lost when it is removed from the terminal bolt 12.

A cross section of a second embodiment of the invention is protrayed in FIG. 4. In this embodiment, a termination 60 is adapted to provide an extra terminal 62 to which a jumper cable is attached for starting the truck in the event the battery fails.

Termination 60 is attached to a cable 63 which consists of a stranded metal wires 64 enclosed in an insulated cover 66. The ends of the stranded wires 64 extend a short distance beyond the end of the insulated cover 66 and are soldered between upper and lower rectangular metal connector plates 68 and 69 respectively. A threaded bolt 70 is passed through a hole 71 in the connector plates 68 and 69 and is held in position by a complimentary threaded nut 72. The entire termination 60 including a portion of the end of cable 64 is potted in a elastomeric enclosure 75 to hermetrically seal all parts of the termination except for the threaded shank 73 of the bolt 70 and upper surface of the complimentary nut 72 which are left exposed.

The depth of the upper tubular section 48 is preferably a little greater than the height of the projection of the terminal bolt 12 above the distal end of tubular projection 42. Also, the depth of the upper tubular section 48 should be sufficiently great such that when the cap it fitted over terminal bolt 12 and pushed down to it's lowest position downward movement is prevented by the upper tubular section 48 resting on the upper edge of tubular projection 42, or by the bottom edge of the lower tubular section 46 resting on the enclosure 38 of the termination 20.

It should be apparent that the upper tubular section 48 should have sufficient depth to enable it to frictionally attach to the terminal bolt 12, and the lower tubular section 46 should have sufficient depth to enable it to frictionally attach to the tubular upward projection 42 when the cap 44 is fitted over terminal bolt 12 and pressed downward to its lowest position. It is also desirable to maximize the frictional contact of both of these two engaging surfaces. It is preferred that the lengths of the tubular sections 46 and 48 be such that the cap 44 will fit over the bolt 12 with the inner surface of the top 50 resting flush against the top of the bolt head 36, the upper edge of the tubular projection 42 contacting the bottom of the upper tubular section 48 and the bottom edge of the lower tubular section 46 resting on the enclosure 38 of the termination 20 as shown in FIG. 2. When all these surfaces of the cap 44 are contacting the corresponding surfaces of the bolt head 36, projection 42 and termination 20, the strength of the cap 44 to withstand impact from a foreign object will be maximized, thereby providing maximum protection to the terminal 12.

An annular ridge 54 is provided around the outer surface of the tubular upward projection 42 and a corresponding groove 56 is provided in the inner surface of the lower tubular section 46. The groove is sized and position such that ridge 54 will snap into the groove 56 when the cap 44 is positioned over terminal bolt 12 and pressed downwardly into it's lowest position. The engagement of the ridge 54 and the groove 56 assists in retaining the cap over the terminal bolt 12.

Terminal 62 is a hexagonal shaped nut 76 which may be grasped by a conventional wrench or by the Jaws of a Jumper cable clamp.

The lower portion of the hexagonal nut 76 has a cylindrical enlargement 80 having an annular lower surface. When hexagonal nut 76 is tightened into threaded hole 74 in the connector 60, the annular lower surface of cylindrical enlargement 80 is compressed against the contact surface 72 and a good electrical contact is made.

Terminal 62 is fitted with a cap 82 in accordance with the present invention. Cap 82 is made from an insulating elastic material and has a generally tubular body 84 with an integral planar top 86 transverse to the axis of the tubular body 84. An annular ridge 88 is provided around the circumference of the top 86 to facilitate grasping the cap 82.

A vertical central bore 90 is provided from the bottom of the cap 82, the diameter of which is a little less than the greatest distance between two edges across the hexagonally shaped nut 76, such that the cap 82 fits tightly on the nut 76 and is held in place by the elastic material of the cap 82 being compressed against the hexagonal nut 76.

Central bore 90 extends sufficiently high into the cap 82 to enable the cap 82 to fit over the entire height of the terminal 62. A downwardly facing annular sealing surface 91 at the bottom of the cap 82 seals against a corresponding upwardly facing annular sealing surface 92 of elastomeric enclosure 75 surrounding the connector plate 68.

The cap 82 further has a second bore 93, concentric with the central bore 90 with a diameter and a depth of which are sufficient to allow the cap 82 to fit over the cylindrical enlargement 80 and permit the downwardly facing annular sealing surface 91 to seal against the upwardly facing annular sealing surface 92 of the elastomeric enclosure 75 around the upper surface of connector plate 68. An annular groove 94 is provided around the bottom of the cap 82.

In each of the two embodiments, the cap is retained over the terminal by the elastomeric material of the cap being compressed against the terminal. The entire height of the cap serves as a gripping surface, and as a result, the cap is held securely and will not be jarred loose by motion of a truck in which it is mounted.

While the present invention has been described in connection with two embodiment, it will be apparent by those skilled in the art that many changes and modifications may be made without departing from the true spirit and scope of the present invention.

What is claimed:

1. A resilient deformable cap for covering a terminal head having a polygon shaped cross section, a portion of which is surrounded by a tubular projection of insulating material extending from adjacent the base thereof, said tubular projection being co-axial with the axis of said terminal and having an outer diameter and an open end, said cap comprising:

a first tubular section having two ends and an inner diameter which is smaller than the greatest dimension across a top of said head having a polygon cross section so as to tightly fit around the portion of said terminal head which is not surrounded by said tubular projection, a second tubular section coaxial with said first tubular section and adjacent one of said ends thereof, said second tubular section having an inner diameter which is not greater than said outer diameter of said tubular projection so as to fit tightly around said outer diameter, a planar top transverse to the axis of said tubular sections and adjacent the other of said ends of said first tubular section, and said first tubular section having a length not more than the length of said portion of said terminal head which is not surrounded by said tubular projection.

* * * * *